United States Patent
Hillier et al.

(10) Patent No.: US 10,496,305 B2
(45) Date of Patent: Dec. 3, 2019

(54) TRANSFER OF A UNIQUE NAME TO A TAPE DRIVE

(71) Applicant: HEWLETT PACKARD ENTERPRISE DEVELOPMENT LP, Houston, TX (US)

(72) Inventors: Christopher Anthony Grant Hillier, Fort Collins, CO (US); Curtis C Ballard, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 75 days.

(21) Appl. No.: 15/304,737

(22) PCT Filed: Apr. 28, 2014

(86) PCT No.: PCT/US2014/035719
§ 371 (c)(1),
(2) Date: Oct. 17, 2016

(87) PCT Pub. No.: WO2015/167432
PCT Pub. Date: Nov. 5, 2015

(65) Prior Publication Data
US 2017/0038991 A1    Feb. 9, 2017

(51) Int. Cl.
*G06F 3/06* (2006.01)
*G11B 5/008* (2006.01)

(52) U.S. Cl.
CPC .......... *G06F 3/0631* (2013.01); *G06F 3/0604* (2013.01); *G06F 3/0607* (2013.01); *G06F 3/0632* (2013.01); *G06F 3/0659* (2013.01); *G06F 3/0664* (2013.01); *G06F 3/0682* (2013.01); *G06F 3/0686* (2013.01); *G11B 5/00813* (2013.01)

(58) Field of Classification Search
CPC ..... G06F 3/0631; G06F 3/0686; G06F 3/0607
See application file for complete search history.

(56) References Cited

U.S. PATENT DOCUMENTS 6,834,324 B1    12/2004  Wood
6,862,656 B2 *   3/2005  Trimmer .............. G06F 3/0605
                                                    711/111
7,177,991 B2     2/2007  Yamamoto et al.
(Continued)

FOREIGN PATENT DOCUMENTS

EP    1324331 A2    7/2003

OTHER PUBLICATIONS

International Search Report & Written Opinion received in PCT Application No. PCT/US2014/035719, dated Feb. 24, 2015, 14 pages.

(Continued)

*Primary Examiner* — Ann J Lo
*Assistant Examiner* — Michelle L Taeuber
(74) *Attorney, Agent, or Firm* — Hewlett Packard Enterprise Patent Department

(57) ABSTRACT

Storage management is performed by detecting installation of at least one new physical tape drive in a storage system. The storage system may include a plurality of tape drives. The plurality of tape drives include physical tape drives and virtual tape drives. Based on the detection, a unique name of at least one virtual tape drive is transferred to the at least one new physical tape drive.

19 Claims, 5 Drawing Sheets

(56) References Cited

U.S. PATENT DOCUMENTS

| | | | |
|---|---|---|---|
| 7,237,056 B2 | 6/2007 | Gold et al. | |
| 7,486,462 B1 | 2/2009 | Starr et al. | |
| 7,610,432 B2* | 10/2009 | Azuma | G06F 3/0607 710/9 |
| 7,747,816 B1 | 6/2010 | Nourmohamadian et al. | |
| 8,078,690 B2 | 12/2011 | Shimozono et al. | |
| 8,381,020 B1* | 2/2013 | Wideman | G06F 11/2092 714/42 |
| 2005/0033911 A1 | 2/2005 | Kitamura et al. | |
| 2008/0162813 A1 | 7/2008 | Haustein et al. | |
| 2008/0222344 A1* | 9/2008 | Upadhyayula | G06F 3/0607 711/4 |
| 2011/0208999 A1 | 8/2011 | Topham et al. | |
| 2012/0198289 A1* | 8/2012 | Hostetter | G11B 5/00821 714/54 |
| 2013/0138705 A1 | 5/2013 | Agetsuma et al. | |

OTHER PUBLICATIONS

Lowe, S., "Understanding NPIV and NPV," Nov. 27, 2009, <http://blog.scottlowe.org/2009/11/27/understanding-npiv-and-npv/>.

Rouse, M., "N_Port ID virtualization (NPIV)," Apr. 21, 2011, <http://searchstorage.techtarget.com/definition/N_Port-ID-virtualization-NPIV?vgnextfmt=print>.

Unylogix Technologies Inc., "TM-L Series—Single Tape Library Mirroring Solution," (Web Page), 2002, 4 pages, available at http://www.unylogix.com/data_storage/tape_mirroring/single_library.html.

Wikipedia, "NPIV," Sep. 14, 2012, <https://en.wikipedia.org/w/index.php?title=NPIV&oldid=512281990>.

* cited by examiner

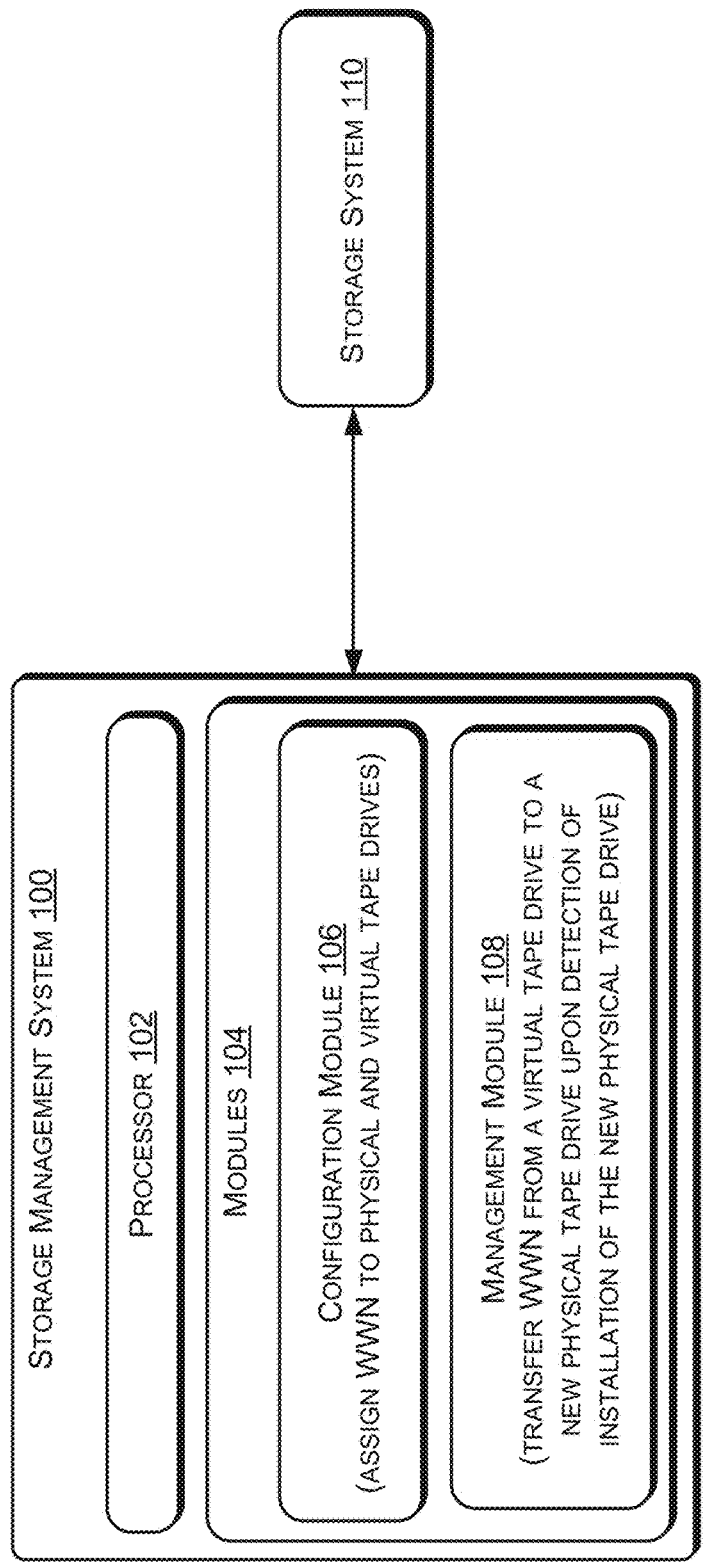

TRANSFER OF A UNIQUE NAME TO A TAPE DRIVE

BACKGROUND

With the ubiquitous use of computing devices and communication networks, demand for data storage has increased exponentially in recent years. Typically, different users store data of interest at different locations. For example, some users may store data on network servers and others may store data on local machines. Thus, organizations may have to ensure that data which is useful to investors, users, and employees is stored and maintained in an efficient manner. Generally, for storing data which is less frequently accessed, organizations employ tape libraries having a plurality of tape drives in which the data is stored on magnetic tapes.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components:

FIG. 1A illustrates a storage management system, according to an example of the present subject matter.

DETAILED DESCRIPTION

Figure 1B:
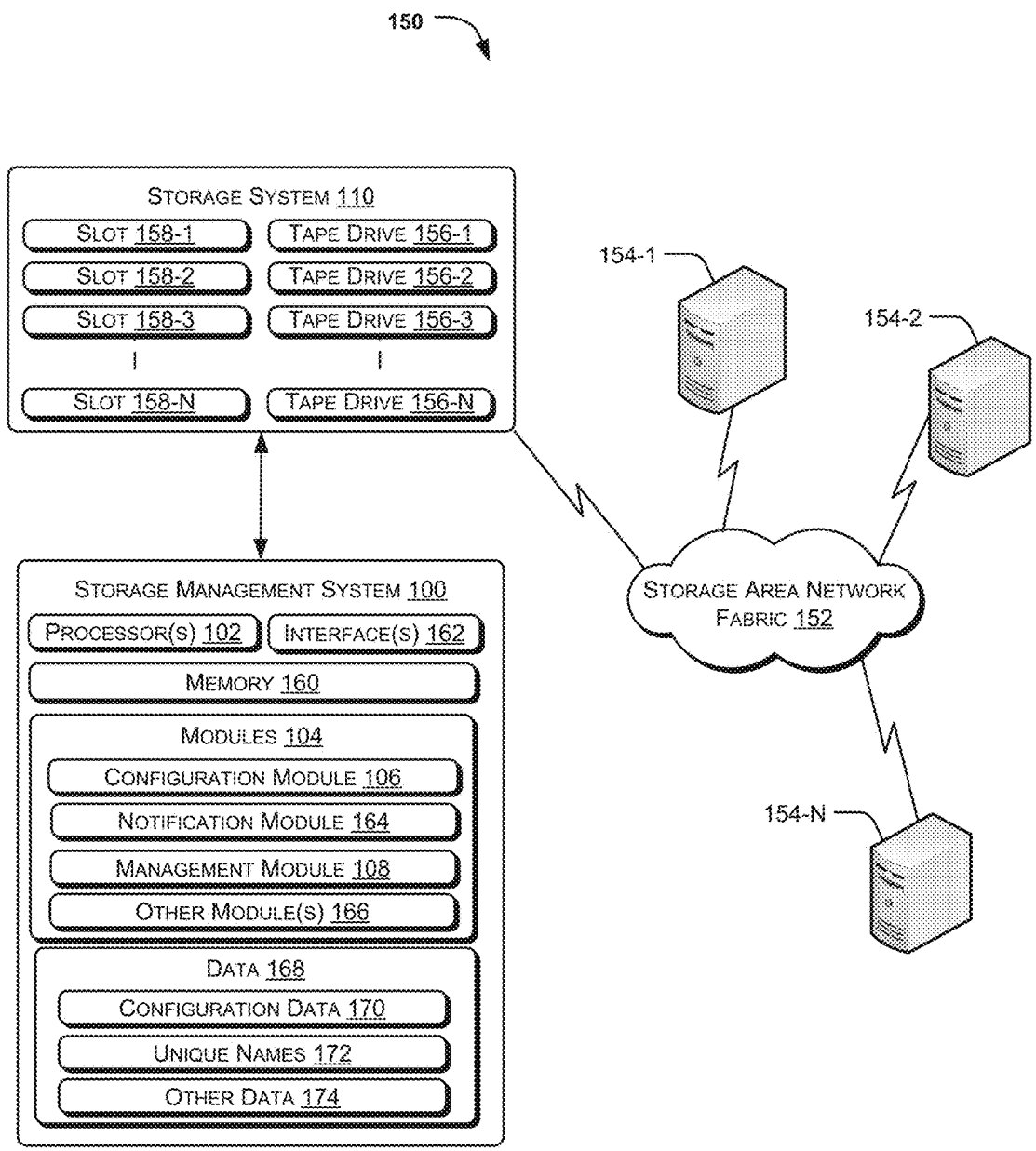
FIG. 1B illustrates a network implementation of the storage management system, according to another example of the present subject matter.

Organizations frequently employ data storage systems, such as tape libraries, for storing data. The data stored in the data storage systems can be accessed by a plurality of users through host devices. A host device may be understood as a computing device that may be connected to a network. The host devices may host information resources, services, and applications for use by users or other devices on the network. Further, the host devices can access the tape libraries to retrieve information from the tape libraries. Each tape library includes one or more storage devices, such as tape drives, that facilitate in performing operations, such as writing to and reading from a magnetic tape. Each magnetic tape is typically packaged in a cartridge, which can be held in a pre-defined slot of the tape library. A tape library can generally accommodate many cartridges to store a large amount of data.

Further, the host devices are connected to the tape drives through the SAN fabric. The SAN fabric may connect with each of the tape drives on the basis of a unique name associated with each of the tape drives. When data is to be retrieved from or written to a particular magnetic tape, a host device communicates over the SAN fabric via a communication interface, such as a Small Computer System Interface (SCSI) bus, for example, with a controller of the tape library. The controller can retrieve a particular cartridge from its slot based on the request and can place the magnetic tape in a tape drive. The host device may then read from or write to the magnetic tape via the tape drive.

Tape libraries are typically purchased with a specific number of tape drives. The number of tape drives is usually pre-defined based on data access requests that are expected to be received from different users for performing operations, such as writing or reading, on the magnetic tape cartridges. As the demand for storage continues to increase at unprecedented rates, predicting future access demands and managing storage infrastructure costs becomes increasingly complex. To be able to manage a large amount of information, the tape libraries employed by organizations have to be equipped with an accordingly large number of tape drives. Further, to accommodate an increase in data access demands, the organizations may have to purchase and connect additional tape drives in the data storage systems for greater data throughput capability.

When additional tape drives are installed, the organizations have to bear additional cost on configuring the data storage system. Moreover, the SAN fabric has to be reconfigured with respect to the additional tape drives such that the host devices may access the additional tape drives over the SAN fabric.

In an embodiment of the present subject matter, a system and a method for non-disruptively managing storage in a storage system is disclosed. In this respect, the present subject matter provides a storage management system with flexibility for adding storage devices in the storage system, such as a tape library, without reconfiguration of the SAN fabric. The tape library may include a plurality of slots for accommodating the magnetic tape cartridges and a plurality of tape drives for reading from or writing onto the magnetic tapes. The storage management system may communicate with the tape library for managing the operation of various components of the tape library.

In an implementation, during initial setup, a user, such as an administrator, may configure the tape library to introduce multiple partitions in the tape library. The multiple partitions may facilitate in separately storing data pertaining to different host devices. Such partitioning ensures that the host devices do not access each other's data even though data from different host devices is maintained in the same physical tape library. Further, the user may configure a partition of the tape library to include a specific number of slots and a specific number of tape drives.

In an implementation, the user may configure the partition of the tape library based on storage demands of an organization. The number of tape drives configured may be indicative of the current and expected future storage demands of the organization. In an example, the user can specify a number of physical tape drives as well as a number of virtual tape drives for being installed in the tape library. For example, the user may specify the number of physical tape drives that may be used to meet current data demands of the organization and may configure the virtual tape drives in order to meet expected future data demands of the organization.

Further, the host devices may be connected with the tape drives over a storage area network (SAN) through a SAN fabric. In an implementation, each of the tape drives may be visible over the SAN to the host devices through a unique name referred to as a worldwide name (WWN). The WWN may be understood as a device specific identifier that is used to identify a specific device on the SAN fabric. The unique name may be a 64 bit address that is used to identify the host devices and storage devices, in the SAN fabric.

In an example, the WWN facilitates in accessing a storage device by a protocol, such as a small computer system interface (SCSI), a fibre channel (FC) SCSI, or an Internet SCSI (iSCSI). Further, each storage device may be associated with at least one logical unit number (LUN). Accordingly, the tape drives may be accessed through the WWN and the LUNs associated with the tape drives. The administrator pre-defines the number of tape drives for being configured in the tape library by taking into account present hardware configurations and future hardware demand. Accordingly, the WWNs may be generated for the pre-defined number of physical as well as virtual tape drives. The administrator may also configure which host devices have access to which storage devices based on the WWN.

Further, the present subject matter includes associating the WWNs with the SAN. In an example, a virtualization technique, such as Node Port Identity Virtualization (NPIV) for fibre channel and an equivalent for serially attached SCSI (SAS) or other similar interconnect technologies may be employed for connecting the WWNs with the SAN. Once the WWNs are connected to the SAN, the SAN fabric reflects the number of tape drives in the tape library in addition to reflecting the host devices accessing those tape drives. Further, the SAN fabric allows the host devices to access the tape drives for performing write/read operations.

In an example, when a host device sends a command to access a virtual tape drive, such as to perform a read and/or write operation on the magnetic tape, an error message indicating that the virtual tape drive is unavailable for performing the requested command is sent to the host device. When the host device sends a command to perform an operation by a physical tape drive, the physical tape drive may send a confirmation message to the host device to confirm that the host device may perform operations on the physical tape drive. The host devices may therefore, send commands to both the virtual and physical tape drives configured in the backup storage system, but may not be able to perform operations on the virtual tape drives.

When additional physical tape drives are to be installed, such as for increasing the data throughput capability of the tape library to meet an increase in access requests, the administrator may deploy a new physical tape drive in the backup storage system. When this happens, the storage management system may receive a notification about installation of the new physical tape drive. Upon receiving the notification, the storage management system may transfer the unique name, i.e., WWN of an existing virtual tape drive to the newly installed physical tape drive. The host devices may then be able to perform operations on the newly installed tape drive by issuing commands to the appropriate WWN. In an example, upon successful installation of the new physical tape drive, the host device is able to read from or write to the new physical tape drive through the re-allocated WWN of a virtual tape drive, which would have been otherwise earlier reported as inaccessible.

Accordingly, the present subject matter provides a scalable storage system. The storage management system may be configured to re-allocate a WWN of a virtual tape drive to a new physical tape drive that is installed in the storage system. Therefore, the storage management system alleviates re-configuration of the SAN that is otherwise performed for adding new physical tape drives in the storage system.

The various systems and the methods are further described in conjunction with the following figures. It should be noted that the description and figures merely illustrate the principles of the present subject matter. Further, various arrangements may be devised that, although not explicitly described or shown herein, embody the principles of the present subject matter and are included within its scope.

The manner in which the systems and the methods for managing storage are implemented are explained in details with respect to FIG. 1A, FIG. 1B, FIG. 2A, FIG. 2B, and FIG. 3. While aspects of described systems and methods for managing storage can be implemented in any number of different computing systems, environments, and/or implementations, the examples and implementations are described in the context of the following system(s).

FIG. 1A illustrates a storage management system 100, according to an example of the present subject matter. In one example, the storage management system 100 may be implemented in a tape library or any other storage system. In another example, the storage management system 100 can be implemented in any network environment comprising a variety of network devices, including routers, bridges, servers, computing devices, storage devices, etc.

In an example, the storage management system 100 may include a processor 102 and modules 104. In some examples, the modules 104 may include processor executable instructions to perform particular tasks, objects, components, data structures, functionalities, etc., to implement particular abstract data types, or a combination thereof. In some examples, the modules 104 may be implemented as signal processor(s), state machine(s), logic circuitries, and/or any other device or component that manipulates signals based on operational instructions. Further, the modules 104 can be implemented by hardware, by computer-readable instructions stored on a computer-readable medium and executable by a processing unit, or by a combination thereof. In one implementation, the modules 104 include a configuration module 106 and a management module 108. Further, the storage management system 100 can communicatively couple with a storage system 110, such as a tape library.

In one example, the configuration module 106 is coupled to the processor 102. For the initial setup, a user, such as an administrator, may provide configuration parameters using the configuration module 106. The configuration parameters may include, for example, a count of tape drives for being implemented in the storage system 110, associated with the storage management system 100. In an example, the tape drives may include virtual as well as physical tape drives. The user may, for example, specify the count of the physical tape drives based on current data demands of an organization or based on the number of tape drives currently installed in the tape library. On the other hand, the count of the virtual tape drives may indicate a future data demand of the organization.

In addition to the number of tape drives, the configuration parameters may include defining access rights of different host devices. For example, the user may define which host device has access to which tape drive. In an implementation, the configuration module 106 may generate various user interfaces which may facilitate in capturing the configuration parameters from the users, such as administrators.

The configuration module 106 may further assign a unique name, for example, from a list of pre-defined unique names to each of the tape drives. In another example, the configuration module 106 may generate the unique names for being assigned to each of the tape drives. As the user has pre-defined the number of tape drives for being configured in the storage system 110, the configuration module 106 assigns the unique names for the physical tape drives as well as the virtual tape drives. In an implementation, a unique name allows a host device to connect with the tape drives.

In an example, the unique name may include a worldwide name (WWN). The WWN may be understood as a device identifier that is used to identify a specific device on the SAN fabric.

In an example, the configuration module 106 may associate the WWNs with the SAN by using a virtualization technique, such as node port ID virtualization (NPIV) in Fibre Channel (FC). The NPIV may be understood as an FC protocol that helps to assign multiple FC addresses on same physical link. In other words, NPIV can make a single FC port appear as multiple virtual ports, each having its own virtual WWN. In another implementation, a similar mechanism may be used for another interface type such as serially attached SCSI (SAS). The NPIV facilitates the configuration module 106 of the storage management system 100 to configure each physical tape drive as more than one physical tape drive while associating with the SAN fabric.

Once the configuration module 106 has assigned the unique names for each of the tape drives, the configuration module 106 may enable the tape drives to connect with the host devices. Further, when a host device sends a command to a tape drive for performing an action, the configuration module 106 may determine whether or not that particular tape drive is available for acting on that command. In the present example, the determination is also based on whether the tape drive is a virtual tape drive or a physical tape drive. When the command is directed towards a virtual tape drive, an error message may be received by the host device notifying the host device that the tape drive, as indicated in the command, is not available for performing the action.

In an example, when the data demands of an organization increases, an administrator may install a new physical tape drive in the storage system 110. The management module 108 may detect the installation of the new physical tape drive in the storage system 110. In an implementation, the storage management system 100 may be implemented within the storage system 110. In such a case, the management module 108 may receive an event notification, from the storage system 110, notifying about installation of the new physical tape drive. In an alternative implementation, the storage management system 100 may be outside the storage system 110. In such a scenario, the storage system 110 may send an event notification to the management module 108 using a protocol for managing devices on networks, such as a simple network management protocol (SNMP). The event notification may indicate installation of the new physical tape drive in the storage system 110.

In the present example, based upon the detection of the new physical tape drive, the management module 108 may transfer the unique name assigned to a virtual tape drive to the new physical tape drive. As discussed above, the host devices connected to the tape drives over the SAN view the tape drives, as the unique names assigned to the tape drives. Therefore, when the management module 108 transfers the unique name of the virtual tape drive to the new physical tape drive, the host devices do not find any change in the SAN fabric as the same unique name that was available earlier is also available now for accessing the new physical tape drive. The host devices may see an existing tape drive disappear from the SAN when the virtual tape drive is removed. Further, the same device would reappear when the unique name is assigned to the new physical tape drive. The disappearing and reappearing of the existing tape drive may indicate that capabilities of the tape drive have changed. Hence, when an existing tape drive disappears or reappears, the host devices may query the tape drive to determine new capabilities thereof.

In addition, the management module 108 may reduce the number of virtual tape drives by one based on the installation of the new physical tape drive. In an example, if the user has installed two new physical tape drives, the management module 108 may transfer the unique names of two virtual tape drives, one each to the new physical tape drives. Thereafter, the management module 108 may communicate with the configuration module 106 to reduce the number of the virtual tape drives by two, thereby maintaining the same total number of tape drives in the storage system 110. The storage management system 100 therefore enables scaling up the data throughput of an organization without inducing additional configuration costs and resources. The network environment of the storage management system 100 is described in greater detail in conjunction with FIG. 1B.

FIG. 1B illustrates a network environment 150 including the storage management system 100 according to another example of the present subject matter. The storage management system 100 may be implemented in various computing systems, such as personal computers, servers, and network servers. The storage management system 100 may be implemented on a stand-alone computing system or a network interfaced computing system. For example, for the purpose of managing storage in the network environment 150, the storage management system 100 can be communicatively coupled over a storage area network (SAN) through a SAN fabric 152 with a plurality of host devices 154-1, 154-2, . . . , 154-N.

The host devices 154-1, 154-2, . . . , 154-N, can be collectively referred to as host devices 154, and individually referred to as a host device 154, hereinafter. The host devices 154 can include, but are not restricted to, servers, and the like. The host devices 154 are communicatively coupled to the storage system 110, such as a tape library, over the SAN. In an example, the host devices 154 may connect to the SAN fabric 152 through a host bus adapter (HBA) (not shown).

In one example, the SAN fabric 152 includes one or more switches for facilitating the host devices 154 to connect to the storage management system 100 and the storage system 110. Further, the SAN fabric 152 may include data routers that act as bridges between different Small Computer Systems Interface (SCSI) devices and the host devices 154 in the SAN. The components of the SAN fabric 152 may communicate through an FC communication protocol.

In an implementation, the storage system 110 includes a plurality of storage devices, such as tape drives 156-1, 156-2, . . . , 156-N. The tape drives 156-1, 156-2, . . . , 156-N, can be collectively referred to as tape drives 156, and individually referred to as a tape drive 156, hereinafter. The tape drives 156 enable performing read and write operations on the magnetic tapes. Further, the storage system 110 includes a plurality of slots 158-1, 158-2, . . . , 158-N. The storage slots 158-1, 158-2, . . . , 158-N, can be collectively referred to as slots 158, and individually referred to as a slot 158, hereinafter. The slots 158 may be configured to accommodate the magnetic tape cartridges. The host devices 154 may access the tape drives 156 through the SAN fabric 152. The tape drives 156 may be coupled to the host devices 154 using SCSI protocol and may use SCSI FC Protocol (SCSI FCP) to communicate with the host device 154.

Further, the storage system 110 is communicatively coupled with the storage management system 100 for configuring various host devices 154 and the tape drives 156 of the storage system 110. In an implementation, the storage management system 100 includes the processor 102 and a memory 160 connected to the processor 102. The memory 160, communicatively coupled to the processor 102, can include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The storage management system 100 also includes interface(s) 162. The interfaces 162 may include a variety of interfaces, for example, storage interfaces, such as FC SCSI interface, interfaces for user device(s), storage devices, and network devices. The user device(s) may include data input and output devices, referred to as I/O devices. The interface(s) 162 facilitate the communication of the storage management system 100 with various communication and computing devices and various communication networks, such as networks that use a variety of protocols, for example, Hypertext Transfer Protocol (HTTP) and Transmission Control Protocol/Internet Protocol (TCP/IP).

Further, the storage management system 100 may include the modules 104. In said implementation, the modules 104 include the configuration module 106, the management module 108, a notification module 164, and other module(s) 166. The other module(s) 166 may include programs or coded instructions that supplement applications or functions performed by the storage management system 100. The modules may be implemented as described in relation to FIGS. 1A and 1B.

In an example, the storage management system 100 includes data 168. The data 168 may include configuration data 170, unique names 172, and other data 174. The other data 174 may include data generated and saved by the modules 104 for implementing various functionalities of the storage management system 100.

The configuration module 106 may receive configuration parameters from a user, such as an administrator. The configuration parameters may include, but are not limited to, a count of tape drives, such as tape drives 156, for being implemented in the storage system 110. In an example, the tape drives 156 may include virtual tape drives as well as physical tape drives. Further, the configuration parameters include defining access rights of different host devices. In an implementation, the configuration module 106 stores the configuration parameters as configuration data 170. Based on the count of the tape drives 156, the configuration module 106 may generate a unique name, such as a WWN, for each of the tape drive 156. The unique names represent the tape drives 156 in the SAN fabric 152 and thereby facilitate the host devices 154 to connect with the tape drives 156. In an example, the configuration module 106 may assign the unique name from a list of pre-defined unique names. In an example, the host devices 154 may recognize the tape drives 156 on the SAN fabric 152, based on the unique names that are indicated in the SAN fabric 152. Using the unique names, the host devices 154 may issue commands to the tape drives 156 for performing operations. In an example, the configuration module 106 may store the unique names for the tape drives 156 as the unique names 172.

In an example, when a host device 154 sends a command to a physical tape drive, such as the tape drive 156-1, the tape drive 156-1 may process the command and report results of the processing to the host device 154. For example, on receiving a query about its availability to perform a certain command, the tape drive 156-1 may indicate, in the response to the query, that it is available for performing the command.

In another example, when a host device 154 sends a command to a virtual tape drive, the host device 154 may receive a response to an information request or an error message in response to an action command. For example, when a link to the SAN fabric 152 is provided by a physical tape drive, i.e., the unique name of the virtual tape drive is linked to the physical tape drive, the physical tape drive may receive a command from the host device 154. In response to the command, the physical tape drive may, on behalf of the virtual tape drive, return an error message indicating that the virtual tape drive is not available for performing the command. In an alternative example, the virtual tape drive may be linked to the interface 162 of the storage management system 100. In the present example, the notification module 164 may receive a command from the host device 154. In response to the command, the notification module 164 may, on behalf of the virtual tape drive, send a notification reporting the unavailability of the virtual tape drive for processing the command.

In an implementation, when the number of storage devices, such as tape drives 156 is to be increased, the user may install a new physical tape drive in the storage system 110. Upon installation of the new physical tape drive, the management module 108 may receive an event notification from the notification module 164 indicating the installation of a new physical tape drive. Upon receiving the event notification, the management module 108 may transfer the unique name assigned to a virtual tape drive to the new physical tape drive. Thus, the transfer of the unique name will not bring any change in the devices presented in the SAN fabric 152 as well as the host devices 154 that are connected to the SAN fabric 152. For example, the host devices 154 may continue to see the same number of devices on the SAN fabric 152 and may continue to see the same device names on the SAN fabric 152.

The transfer of the unique name, by the management module 108, from the virtual tape drive to the newly added physical tape drive obviate a system administrator's work regarding performing any changes in the configuration of the host devices 154 and the SAN fabric 152 due to addition of new physical tape drives in the storage system 110. Accordingly, the storage system 110 may facilitate in adding storage devices, such as tape drives 156, in the storage system 110 without having to make any changes in the configuration of the SAN fabric 152 and the host devices 154.

Accordingly, the storage management system 100 enables the addition of the new tape drives in an existing storage system without performing any configuration changes for SAN fabric 152 or the host devices 154. The storage management system 100 may be configured to re-allocate a unique name of a virtual tape drive to a new physical tape drive that is installed in the storage system 110. Therefore, the storage management system 100 alleviates any change in configuration of the host devices 154 or storage area network fabric 152 when the new physical tape drive is added in the storage system 110 to facilitate increase in data throughput.

Figure 2A:
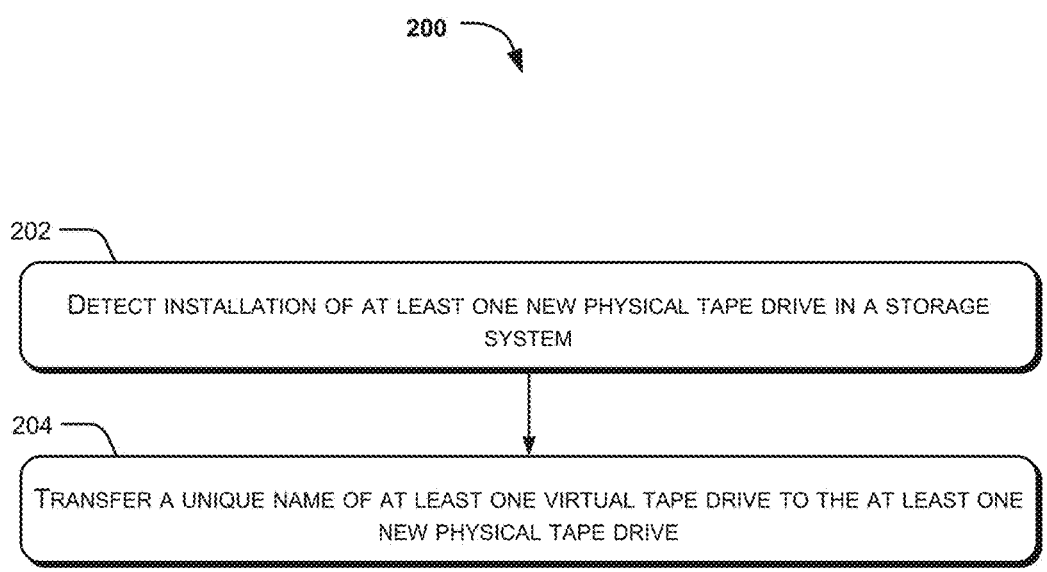
FIG. 2A illustrates a method for storage management, according to an example of the present subject matter.
Figure 2B:
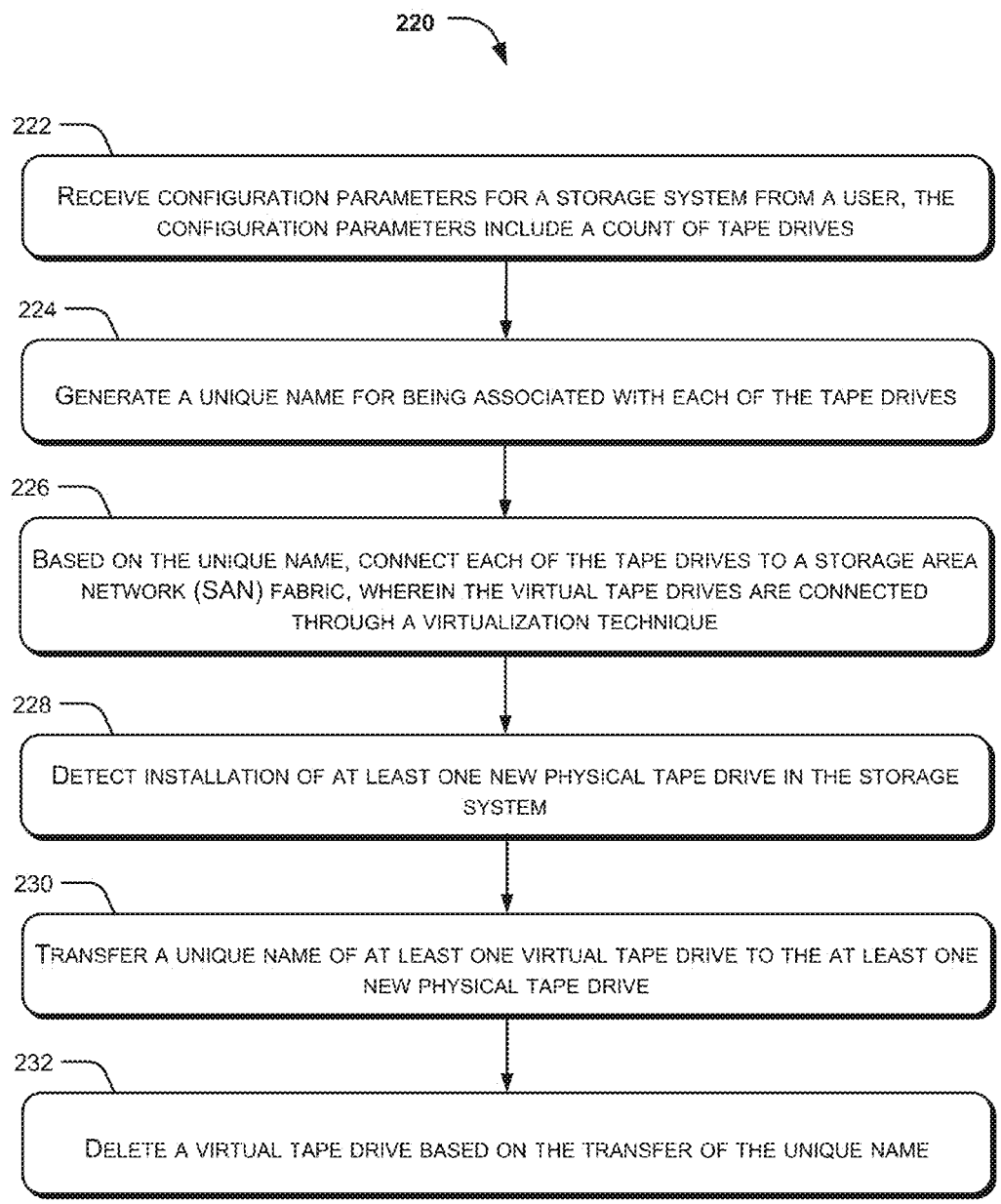
FIG. 2B illustrates a method for storage management, according to another example of the present subject matter.

FIGS. 2A and 2B illustrate methods 200 and 220 for storage management, according to an example of the present subject matter. The order in which the methods 200 and 220 are described is not intended to be construed as a limitation, and some of the described method blocks can be combined in a different order to implement the methods 200 and 220, or an alternative method. Additionally, individual blocks may be deleted from the methods 200 and 220 without departing from the spirit and scope of the subject matter described herein. Furthermore, the methods 200 and 220 may be implemented in any suitable hardware, computer-readable instructions, or combination thereof.

The steps of the methods 200 and 220 may be performed by either a computing device under the instruction of machine executable instructions stored on a computer readable medium or by dedicated hardware circuits, microcontrollers, or logic circuits. Herein, some examples are also intended to cover computer readable medium, for example, digital data storage media, which are machine or computer readable and encode machine-executable or computer-executable instructions, where said instructions perform some or all of the steps of the described methods 200 and 220.

With reference to method 200 as depicted in FIG. 2A, as shown in block 202, the method 200 includes detecting installation of at least one new physical tape drive in the storage system 110. In an implementation, the management module 108 may receive an event notification, when the at least one new physical tape drive is installed in the storage system 110.

As illustrated in block 204, the method 200 includes transferring, based on the detection, a unique name of at least one virtual tape drive to the at least one new physical tape drive. In an example, the management module 108 may use an appropriate protocol, such as NPIV, for connecting the virtual tape drives with the SAN fabric 152. Thereafter, the management module 108 may transfer the unique name of the virtual tape drive to the new physical tape drive. As a result, the new physical tape drive connects to the SAN fabric 152 with the same unique name that was previously assigned to a virtual tape drive. Accordingly, the host devices 154 may continue to see the same unique names in the SAN fabric 152.

With reference to FIG. 2B, at block 222, the method 220 includes receiving configuration parameters for a storage system 110, from a user, such as an administrator. The configuration parameters include a count of the tape drives 156 for being installed in the storage system 110. In an example, the tape drives 156 may include physical tape drives as well as virtual tape drives for being installed in the storage system 110.

As depicted in block 224, the method 220 includes generating a unique name for each of the tape drives 156. In an example, the configuration module 106 may generate the unique names, such as WWNs. The unique names represent the tape drives 156 on the SAN fabric 152. In another example, the configuration module 106 may assign the unique names from a list of pre-defined unique names.

As shown in block 226, the method 220 includes connecting each of the tape drives 156 to a storage area network (SAN) fabric 152, based on the unique name. As the unique name is associated with each of the tape drives 156, the unique names represent the tape drives 156 in the SAN fabric 152. In an implementation, the SAN fabric 152 connects with each of the virtual tape drives 156 by using a virtualization technique, such as NPIV for fiber channel. The configuration module 106 may create connections for the virtual tape drives and the SAN fabric 152 through the NPIV. Based on the unique names, the host devices 154 may issue commands to the tape drives 156.

As illustrated in block 228, the method 220 includes detecting installation of at least one new physical tape drive in the storage system 110. In an implementation, the storage management system 100 may be implemented within the storage system 110. In this case, the management module 108 may receive an event notification, such as through an internal event notification mechanism, informing about the installation of the new physical tape drive. In an alternative implementation, the storage management system 100 may be outside the storage system 110. In such a scenario, the storage system 110 may send an event notification to the management module 108 using any protocol for managing devices on networks, such as a simple network management protocol (SNMP). The event notification may indicate the installation of the new physical tape drive in the storage system 110.

As shown in block 230, the method 220 includes transferring, based on the detection in block 228, a unique name of at least one virtual tape drive to the at least one new physical tape drive. In an example, the management module 108 may transfer the unique name of the virtual tape drive to the new physical tape drive. The host devices 154 may continue to see the same unique names in the SAN fabric 152.

As depicted in block 232, the method 220 includes deleting a virtual tape drive based on the transfer of the unique name. In an example, once the management module 108 transfers the unique name to the new physical tape drive, the management module 108 may communicate with the configuration module 106 and delete the number of virtual tape drives based on the addition of new physical tape drives.

Figure 3:
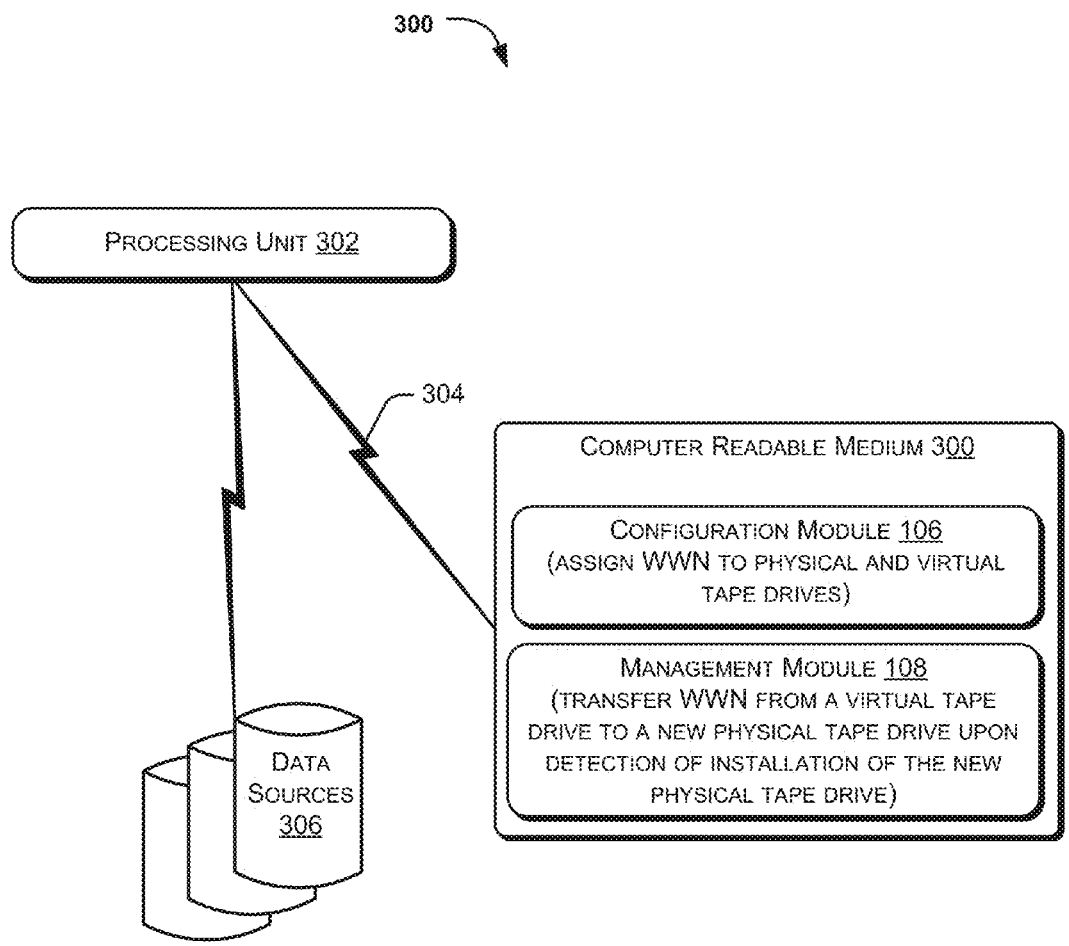
FIG. 3 illustrates a computer readable medium storing instructions for storage management, according to an example of the present subject matter.

FIG. 3 illustrates a computer readable medium 300 storing instructions for storage management, according to an example of the present subject matter. In one example, the computer readable medium 300 is communicatively coupled to a processing unit 302 over a communication link 304.

For example, the processing unit 302 can be a computing customer device, such as a server, a laptop, a desktop, a mobile customer device, and the like. The computer readable medium 300 can be, for example, an internal memory customer device or an external memory customer device, or any non-transitory computer readable medium. In one implementation, the communication link 304 may be a direct communication link, such as any memory read/write interface. In another implementation, the communication link 304 may be an indirect communication link, such as a network interface. In such a case, the processing unit 302 can access the computer readable medium 300 through a network.

The processing unit 302 and the computer readable medium 300 may also be communicatively coupled to data sources 306 over the network. The data sources 306 can include, for example, databases and computing customer devices. The data sources 306 may be used by the requesters and the agents to communicate with the processing unit 302.

In one implementation, the computer readable medium 300 includes a set of computer readable instructions, such as the configuration module 106 and the management module 108. The set of computer readable instructions can be accessed by the processing unit 302 through the communication link 304 and subsequently executed to perform acts for storage management.

On execution by the processing unit 302, the configuration module 106 may receive configuration parameters from a user, such as an administrator. The configuration parameters include a count of tape drives 156 for being implemented in the storage system 110. In one example, the tape drives 156 include physical tape drives as well as virtual tape drives. The physical tape drives indicate a current storage demand of an organization and the virtual tape drives indicate a future storage demand of the organization. Further, the configuration module 106 generates a unique name for being associated with each of the tape drives 156. In an example, the configuration module 106 may assign the unique name to each of the tape drives 156 from a list of pre-defined unique names.

Further, the tape drives 156 connect to a plurality of host devices 154 through a storage area network (SAN) fabric 152. The tape drives 156 are represented on the SAN fabric 152 through the unique names associated with them. Based on the unique names, the host devices 154 issue commands to the tape drives 156. If a command requesting modification of settings or media is issued to a virtual tape drive, the storage system 110 hosting the virtual tape drive may send an error notification to the host device 154 indicating that the tape drive 156 is not available for acting on the command.

In an example, the virtual tape drives may be presented by the interface 162 of the storage management system 100. In the present example, when the notification module 164 receives a command from the host device 154, the notification module 164 may, on behalf of the virtual tape drive, send a notification reporting unavailability of the virtual tape drive for processing the command.

In an example, when the storage demands of the organization grow, the user may install a new physical tape drive in the storage system 110. Upon installation, the storage system 110 may notify the management module 108. The management module 108 may then transfer the unique name assigned to a virtual tape drive to the new physical tape drive. The management module 108, thereby, allows the host devices 154 to interact with the new physical tape drive. The storage management system 100, therefore, alleviates any change in the configuration of the host devices 154 and the SAN fabric 152 due to addition of new physical tape drives in the storage system 110.

Although implementations for storage management have been described in language specific to structural features and/or methods, it is to be understood that the appended claims are not necessarily limited to the specific features or methods described. Rather, the specific features and methods are disclosed as examples of systems and methods for storage management.

We claim:

1. A method for storage management, the method comprising:
   detecting, by a processor, installation of at least one new physical tape drive in a storage system, wherein the storage system includes a plurality of tape drives, and wherein the plurality of tape drives include physical tape drives, wherein each physical tape drive is assigned a unique name, and virtual tape drives, wherein each virtual tape drive is pre-allocated a unique name to reserve the unique name for a new physical tape drive; and
   based on the detection, transferring, by the processor, the pre-allocated unique name of at least one virtual tape drive to the at least one new physical tape drive,
   wherein any command sent from a host device to any of the virtual tape drives produces an error message.

2. The method as claimed in claim 1 further comprising receiving, by the processor, configuration parameters from a user, wherein the configuration parameters include a count of the physical tape drives and a count of virtual tape drives for being installed in the storage system.

3. The method as claimed in claim 1 further comprising pre-allocating, by the processor, the unique names to the virtual tape drives and physical tape drives, wherein the unique names allow at least one host device to connect with the plurality of tape drives.

4. The method as claimed in claim 3, wherein the pre-allocating comprises selecting a unique name from a list of predefined unique names.

5. The method as claimed in claim 3, wherein the pre-allocating comprises generating a unique name.

6. The method as claimed in claim 3 further comprising connecting each of the physical tape drives and the virtual tape drives with a storage area network (SAN) fabric through the unique names, wherein a virtualization technique is employed for connecting the virtual tape drives with the SAN fabric.

7. The method as claimed in claim 1, wherein the detecting includes receiving an event notification from the storage system upon installation of the at least one new physical tape drive.

8. The method as claimed in claim 1 further comprising reducing a number of virtual tape drives from the total virtual tape drives, based on the installation of the at least one new physical tape drive.

9. A storage management system comprising:
   a processor;
   a configuration module, coupled to the processor, to,
      receive configuration parameters from a user, wherein the configuration parameters include a count of tape drives in a storage system, and wherein the tape drives include physical tape drives and virtual tape drives; and
      pre-allocate unique names to the physical tape drives and the virtual tape drives of the storage system to allow a host device to connect with the tape drives, wherein virtual tape drives reserve unique names for new physical tape drives based on slots available in the storage system; and a management module, coupled to the processor, to,
   detect installation of a new physical tape drive in the storage system;
   transfer a unique name assigned to a virtual tape drive to the new physical tape drive, wherein a number of virtual tape drives is reduced based on the transfer of the unique name;
   and send an error message to any host device sending commands to the virtual tape drives.

10. The storage management system as claimed in claim 9, wherein the unique name for each of the tape drives is assigned to various fibre channel ports via a virtualization technique of the configuration module.

11. A non-transitory computer-readable medium having a set of computer readable instructions that, when executed, cause a storage management system to:
   pre-allocate unique names to physical tape drives and virtual tape drives of a storage system, wherein a unique name is initially pre-allocated to a virtual tape drive to reserve the unique name for a new physical tape drive and wherein virtual tape drives are pre-allocated unique names based on expected storage demands;
   detect installation of the new physical tape drive in the storage system;
   transfer the unique name pre-allocated to the virtual tape drive to the new physical tape drive;
   and delete the virtual tape drive based on the transfer of the unique name.

12. The non-transitory computer-readable medium as claimed in claim 11, wherein the non-transitory computer-readable medium further comprises instructions executable by the storage system to,
   receive configuration parameters from a user, wherein the configuration parameters include a count of tape drives for being installed in a storage system, and wherein the tape drives include at least one physical tape drive and at least one virtual tape drive, wherein the pre-allocated unique name of each of the tape drives allow at least one host device to connect with the tape drives;

connect each of the physical tape drives and the virtual tape drives with a storage area network (SAN) fabric through the unique name, wherein a virtualization technique is employed for connecting the virtual tape drives with the SAN fabric.

13. The non-transitory computer-readable medium as claimed in claim 12, wherein the non-transitory computer-readable medium further comprises instructions executable by the storage system to send an error message to the at least one host device when a command is addressed to the unique name of the at least one virtual tape drive.

14. The non-transitory computer-readable medium as claimed in claim 12, wherein the allocation is based on one of assignment of the unique name from a list of pre-defined unique names and generation of the unique name.

15. The method as claimed in claim 1 further comprising, receiving, by the storage system, a query to determine capabilities of the new physical tape drive.

16. The storage management system as claimed in claim 9, wherein the host device sends a query to the new physical tape drive to determine the capabilities of the new physical tape drive.

17. The storage management system as claimed in claim 9, wherein the configuration parameters include access rights of the host device.

18. The storage management system as claimed in claim 9, wherein the command is a read/write operation.

19. The storage management system as claimed in claim 10, wherein the virtualization technique is a Node Port ID Virtualization (NPIV) for Fibre channel.

* * * * *